United States Patent [19]
Poletto et al.

[11] Patent Number: 5,920,255
[45] Date of Patent: Jul. 6, 1999

[54] RATIOMETRIC PROCESSING AND DRIVER CIRCUIT

[75] Inventors: Vanni Poletto, Casale Monferrato; Alberto Poma, Pavia; Marco Morelli, Leghorn, all of Italy

[73] Assignees: SGS-Thomson Microelectronics, S.r.l., Agrate Brianza; Magneti Marelli S.p.A., Milan, both of Italy

[21] Appl. No.: 08/902,558

[22] Filed: Jul. 29, 1997

[30] Foreign Application Priority Data

Jul. 30, 1996 [EP] European Pat. Off. ............ 96830421

[51] Int. Cl.$^6$ ...................................... B60Q 1/00
[52] U.S. Cl. .................. 340/450.2; 340/438; 340/623; 340/612; 73/313
[58] Field of Search .................. 340/450.2, 438, 340/439, 620, 618, 623, 603, 612; 73/304 C, 313; 324/123 R, 125

[56] References Cited

U.S. PATENT DOCUMENTS

| | | | |
|---|---|---|---|
| 4,309,656 | 1/1982 | Okanobu | 324/131 |
| 4,517,547 | 5/1985 | Gray et al. | 340/439 |
| 5,483,109 | 1/1996 | Gholston | 73/313 |
| 5,504,425 | 4/1996 | Fericean et al. | 324/207.16 |

FOREIGN PATENT DOCUMENTS 0 167 674 A1   1/1986   European Pat. Off. .
44 24 240      6/1995   Germany .

*Primary Examiner*—Nina Tong
*Attorney, Agent, or Firm*—Allen, Dyer, Doppelt, Milbrath & Gilchrist, P.A.

[57] ABSTRACT

The electronic interface circuit can perform ratiometric processing and driving of a signal generated by a fuel-level detector of a vehicle. The circuit uses a current mirror configured so as to send one half of the output current to the input resistance and one half of the output current to earth. The current mirror is controlled by a voltage taken from the input resistance and by a voltage taken from a resistive divider, the latter voltage having been filtered by a low-pass filter, so as to achieve ratiometric processing of the input signal.

42 Claims, 5 Drawing Sheets

RATIOMETRIC PROCESSING AND DRIVER CIRCUIT

FIELD OF THE INVENTION

The present invention relates in general to an interface circuit between a sensor device and a display device. More specifically, the present invention relates to an interface circuit having ratiometric processing and filtering functions, particularly for a fuel-level indicator for a vehicle.

BACKGROUND OF THE INVENTION

In electronic circuits, the data to be processed are generally represented by absolute values of electrical quantities, voltage and currents. Sometimes, however, it is convenient to encode the data by means of a ratio between electrical quantities, rather than by means of the absolute values of these quantities. Advantages are thus achieved in terms of insensitivity to voltage and current reference values. In fact, if, for example, all of the voltages are proportional to a reference value, such as, typically the supply voltage, then the ratio between any two voltages is independent of this reference value. In the case in question, the datum to be processed is a ratio between voltage and current, that is, a resistance. This means that the input datum, or in a broad sense, the input signal, is a resistance and the output datum or signal is also a resistance.

Figure 1:
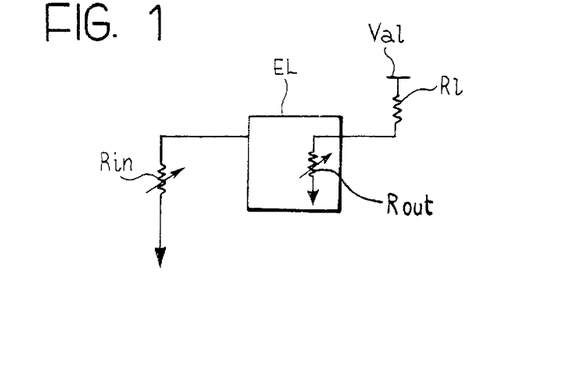
FIGS. 1, 2 and 3 are schematic representations of circuits of the prior art and have already been described.

This situation is represented in FIG. 1 which shows a generic electronic circuit EL of which the input includes a resistance Rin and the output includes another resistance Rout. This output resistance Rout can be detected by its connection to a supply voltage Val by means of a load resistance R1. The current flowing through the two resistances R1 and Rout depends upon the value of the output resistance Rout since the resistance R1 is known and constant. A voltage indicative of this current and hence indicative of the output resistance Rout can thus be detected at the terminals of the resistance R1.

Figure 2:
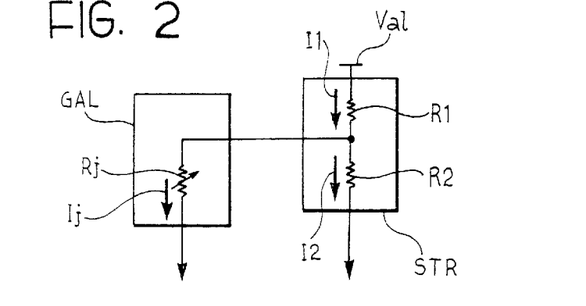

The application for which the present invention has been developed is the indication of the fuel level in a motor vehicle. FIG. 2 is a block diagram of a conventional system in which a sensor with a movable float GAL which is disposed in the vehicle's fuel tank causes a resistance Rj to vary in dependence on the fuel level and consequently varies a current Ij flowing through the resistance Rj.

This float sensor is typically connected to an indicator instrument STR with a needle, for example, of the type with crossed coils. The resistance Rj is connected to the common connection point of the two crossed coils with respective resistances R1 and R2 which generate a magnetic field of variable orientation. This orientation corresponds to the orientation adopted by the needle of the instrument STR. Since each of the two spatial components of the magnetic field is proportional to one of the two currents I1 and I2 in the two coils R1 and R2, the angular position of the movable coil and hence of the needle of the instrument STR depends solely upon the ratio between the currents I1 and I2, and hence on the current Ij absorbed by the resistance R.

This ratio remains constant with variations of the reference voltage Val so that the orientation of the magnetic field, and hence of the needle, does not change with the supply voltage Val. The operating principle just explained is generally termed ratiometricity. Any processing of the signal supplied by the float GAL to the indicator instrument STR necessitates consideration of this principle. This processing typically includes filtering which keeps the indication of the instrument STR substantially constant and accurate, in spite of considerable fluctuations about a mean value induced in the float GAL by the movements of the fuel when the vehicle is in motion.

Circuits which process the signal supplied by the float GAL and have the aforementioned objective are known in the art. For example, this objective is typically addressed by the conversion of the resistance Rj of the float GAL into a voltage which may subsequently be converted into digital form. The voltage is then filtered in a conventional analog or possibly digital manner and the resulting signal is converted once more into an output resistance Rout for driving the indicator instrument STR.

Figure 3:
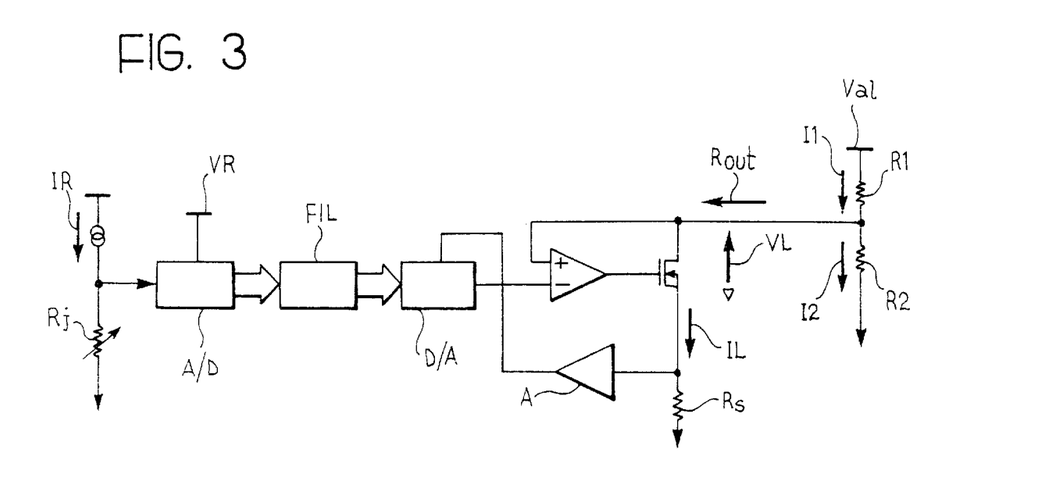

FIG. 3 shows a basic diagram of a circuit according to the prior art, from which it can be seen that, in the steady state, the precision of the ratio Rout/Rj, which should be unitary, depends upon a certain number of factors. One of these factors is IR/VR, that is, the ratio between the current IR which flows in the input resistance Rj and the reference voltage VR of an analog/digital converter A/D disposed 30 at the input of a digital filter FIL. At the output of the digital filter FIL there is also a digital/analog converter D/A and a circuit for converting the filtered voltage into an output resistance Rout. This circuit uses an amplifier A to cause an output current IL to flow through a resistance Rs. The precision of the amplifier A and of the resistance Rs also affect the precision of the ratio Rout/Rj as, of course, does the precision of the two converters A/D and D/A.

These factors are not easily controlled, particularly when the circuit shown in FIG. 3 is formed by monolithic integration. The prior art approaches also have the disadvantage of considerable complexity. Moreover, in the approach shown, there are considerable sources of inaccuracy caused by greatly differing resistance ratios.

SUMMARY OF THE INVENTION

The object of the present invention is to provide an interface circuit which can solve the problems of the prior art indicated above in satisfactory manner.

According to the present invention, this object is achieved by virtue of an interface circuit for supplying at its output a second electrical resistance proportional to a first electrical resistance associated with the liquid level sensor. The processing circuit preferably comprises a current mirror for sending substantially one half of an output current to the first electrical resistance, and substantially one half of the output current to ground. The processing circuit preferably further includes control means for controlling the current passing through the current mirror based upon a first voltage related to the first electrical resistance. The control means preferably comprises a filter for filtering the first voltage.

A ratio of proportionality between the first electrical resistance and the second electrical resistance in one embodiment is preferably substantially unitary. In other embodiments, the ratio may be other than one.

The processing circuit may further include means for supplying an output current and an output voltage substantially equal, respectively, to twice an input current and twice an input voltage present in the first electrical resistance. The control means may comprise an operational amplifier which receives as inputs a first filtered voltage from filter and a reference voltage. The filter may be an analog filter or a digital filter. For the digital filter embodiment, the processing circuit may further comprise an analog/digital converter and a digital/analog converter connected to the input and to the output of the digital filter, respectively. The filter may be a low-pass filter.

A reference voltage may be generated and used by the analog/digital and digital/analog converters. The reference voltage may be derived from a supply voltage to ensure the ratiometricity of the circuit. In addition, processing circuit may also include means for supplying a reference voltage to an input of the operational amplifier derived from a supply voltage to ensure the ratiometricity of the circuit.

The present invention is particularly applicable to a fuel level sensing circuit, such as for a vehicle. Accordingly, the filter may be a low-pass filter with a relatively long time constant to cancel out fluctuations in the first electrical resistance due to movements of fuel when the vehicle is in motion.

BRIEF DESCRIPTION OF THE DRAWINGS

Further advantages and characteristics of the present invention will become clear from the following detailed description, given with the aid of the appended drawings, provided by way of non-limiting example, in which.

DETAILED DESCRIPTION OF THE PREFERRED EMBODIMENTS

Figure 4:
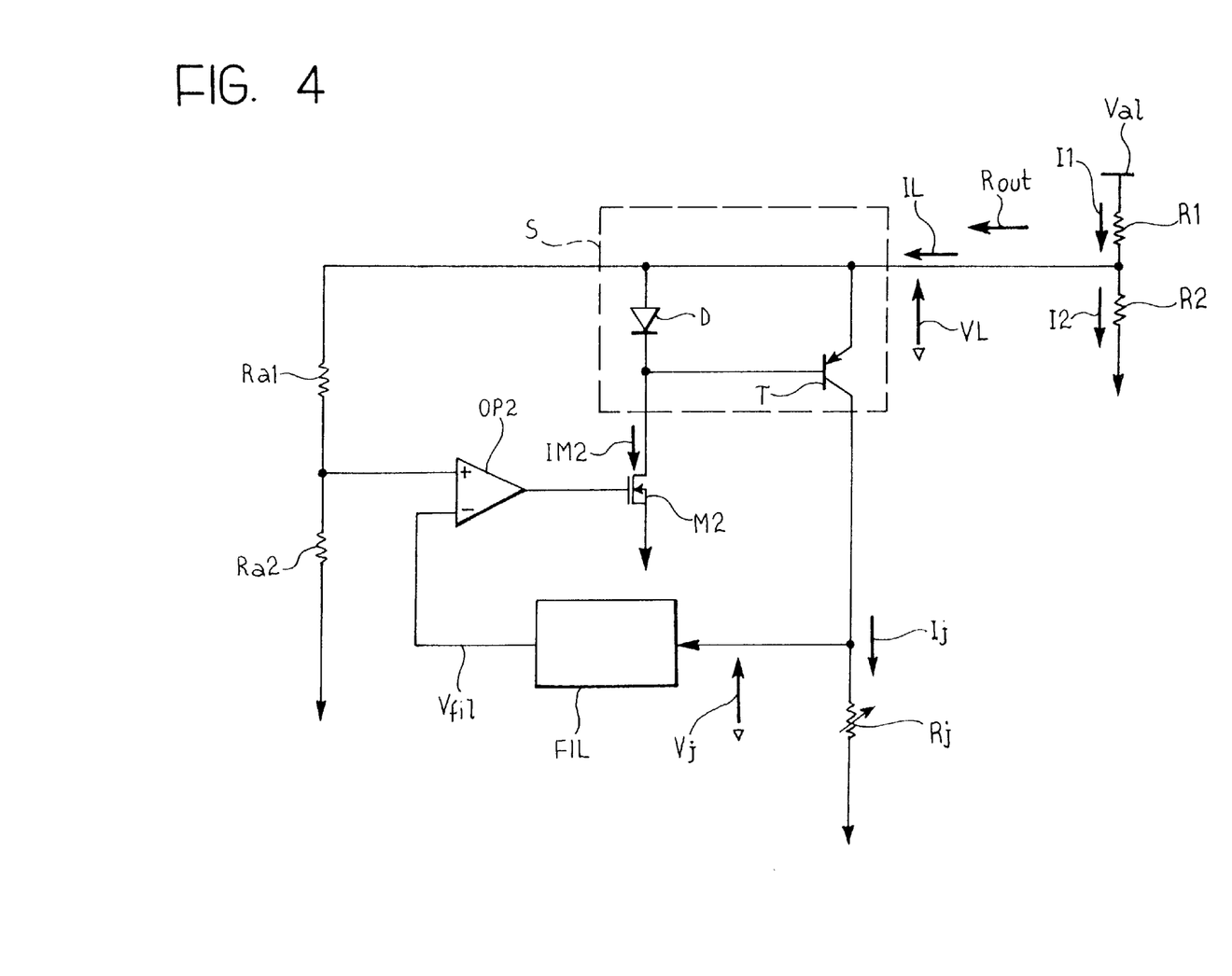
FIG. 4 is a schematic representation of an embodiment of the circuit according to the present invention.

In FIG. 4 and the subsequent drawings, the same reference numerals and letters have been assigned to parts and elements already described with reference to FIGS. 1, 2 and 3. FIG. 4 is a simplified circuit diagram illustrating the principle of the invention. As in the prior art, the object is to drive a load, represented by the resistive divider provided by the resistances R1 and R2, by means of an output resistance Rout with a value equal to the mean value of the input resistance Rj.

To achieve this result, an output current IL taken from the central node of the resistive divider R1, R2 is divided, for example, into two equal parts by means of a current mirror S provided, for example, by a diode D and a transistor T.

A first half IM2 of the output current IL is transmitted to ground by a transistor M2 controlled by an operational amplifier OP2. The second half Ij of the output current IL on the other hand, is sent to the input resistance Rj. After it has been filtered by the filter FIL, a voltage Vj present at the terminals of the input resistance Rj reaches the inverting input of the operational amplifier OP2. This drives the transistor M2 so as to set, at the output terminal of the circuit, a voltage VL equal to twice the voltage present at its inverting input. This occurs by virtue of the amplification factor achieved by the resistive divider formed by the resistances Ra1 and Ra2, which are equal.

A current which flows in a resistive divider provided by two resistances Ra1, Ra2 is typically negligible. If, however, this current were not negligible and were to cause a problem, a voltage follower interposed between the output terminal and the resistance Ra1 would be sufficient to solve it. The output Rout at the output terminal of the circuit is thus equal to the input resistance Rj since, in the latter, there are a voltage Vj and a current Ij which are half of the output voltage VL and half of the output current IL, respectively.

The filter FIL interposed between the input resistance Rj and the inverting input of the operational amplifier OP2 allows the output voltage VL, which is still constantly equal to twice the voltage Vfil output from the filter FIL, to have time- or frequency-dependent behavior. This can be predetermined at will based upon the basis of the type of filter FIL selected.

With regard to the application discussed above relating to the damping of the signal indicative of the fuel level, the filter FIL should be of the low-pass type with an extremely long time constant. It is therefore advantageous to use a digital filter FIL with analog/digital and digital/analog conversion at the input and at the output.

The following algebraic steps:
Vj=Rj Ij=Rj IL/2
VL(s)=(1+Ra1/Ra2) F(s) V(s)
L(s)=(1+Ra1/Ra2) F(s)Rj(s)IL(s)/2
Rout(s)=VL(s)/IL(s)=(1+Ra1/Ra2)2 F(s)Rj(s)
if Ra1=Ra2, lead to the following result: Rout(s)=F(s) Rj(s).

It can thus be seen that the input datum which is the input resistance Rj(s) is output as the output resistance Rout(s) filtered by the transfer function F(s) of the filter FIL, where s is the complex frequency.

With reference once again to the known prior art approach shown in FIG. 3, it can be seen that, if the input resistance Rj were constant, the output of the filter FIL and hence also the output resistance Rout, would also-be constant. Consequently, if the supply voltage Val varies by a certain percentage value, the output voltage VL will instantaneously vary by the same percentage value, thus conforming to the ratiometricity principle. This is because the filter FIL is outside the feedback loop which generates the output resistance Rout and includes the operational amplifier, the transistor, the resistance Rs and the amplifier A, and the digital/analog converter D/A.

With reference to the embodiment of the invention shown in FIG. 4, however, the filter FIL would also have an undesired filtering effect with regard to the variations of the supply voltage Val. This is due to the fact that the filter FIL is inside the feedback loop which generates the output resistance Rout. In fact, the output voltage VL is proportional to the output voltage of the filter FIL which, if it is of the low-pass type, would not be able to vary instantaneously to follow the variations of the supply voltage Val in a ratiometric manner.

Figure 5:
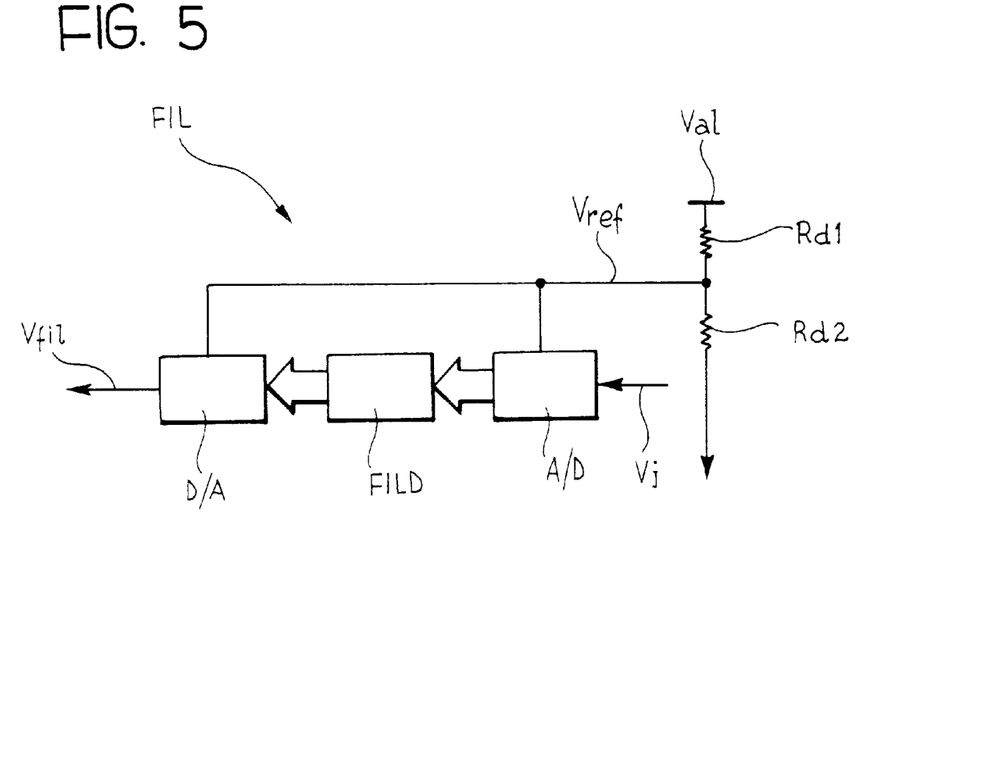
FIGS. 5 and 6 are schematic representation of two alternative embodiments of a portion of the circuit of FIG. 4, and FIGS. 7 and 8 are schematic representations of two alternative embodiments of the circuit according to the present invention.
Figure 6:
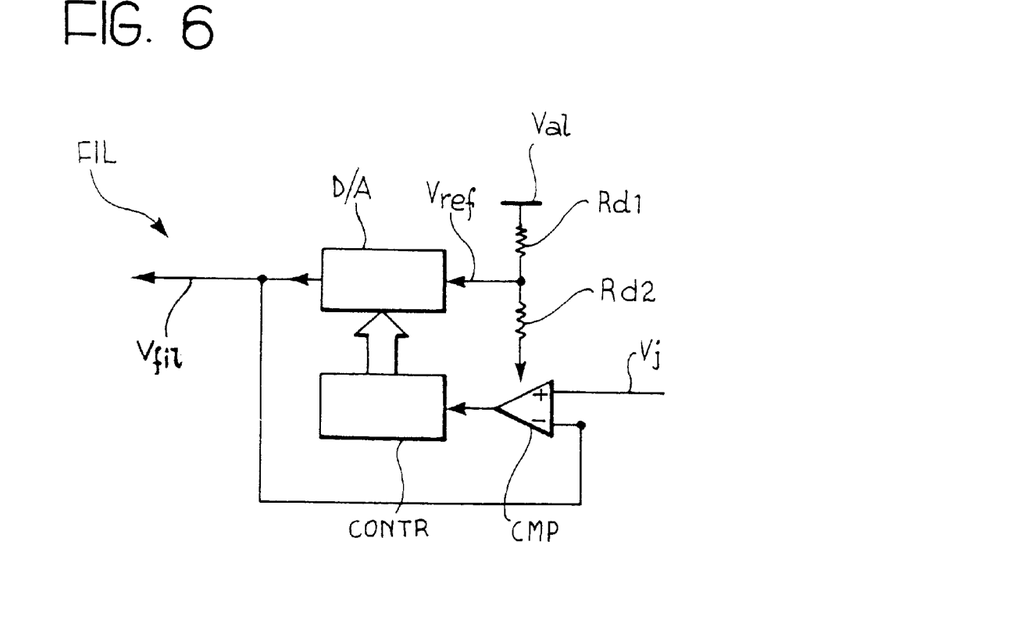

This problem can be solved quite simply, however, if the filter FIL is provided using digital techniques and with the use of analog/digital and digital/analog converters at the input and at the output as shown in FIGS. 5 and 6. These FIGS. 5 and 6 show two possible embodiments of the filter FIL shown in FIG. 4. FIG. 5 shows a conventional design which receives the voltage Vj at its input and outputs the filtered voltage Vfil using a digital filter FILD and two converters. These filters include an analog/digital converter A/D at the input and a digital/analog converter D/A at the output.

FIG. 6, on the other hand, shows a design sing a digital control circuit CONTR, carrying out the filtering operation. The output of this digital control circuit CONTR is connected to a digital/analog converter D/A and its input is connected to a comparator CMP which receives feedback from the output of the converter D/A.

Both of the filters FIL shown in FIGS. 5 and 6 are known in the art. The filter FIL of FIG. 5 is identical to that used in the prior art circuit of FIG. 3. The filter FIL shown in FIG. 6 is a more advantageous circuit since it is more accurate and simpler, but it cannot be inserted in the circuit of FIG. 3. The reason for this is essentially that the analog input and output voltages of the filter FIL (that is, before and after conversion) of FIG. 3 have different values, even in a steady state. In fact, the references of the two converters A/D and D/A are different.

In both cases, the converters A/D and D/A use a limit reference Vref obtained from the supply voltage Val by resistive divider Rd1, Rd2. In fact, it is sufficient for the voltage references of these converters A/D and D/A to be ratiometric with the supply voltage Val for all of the currents and voltages of the circuit (including that at the output of the filter FIL) to be ratiometric.

Figure 7:
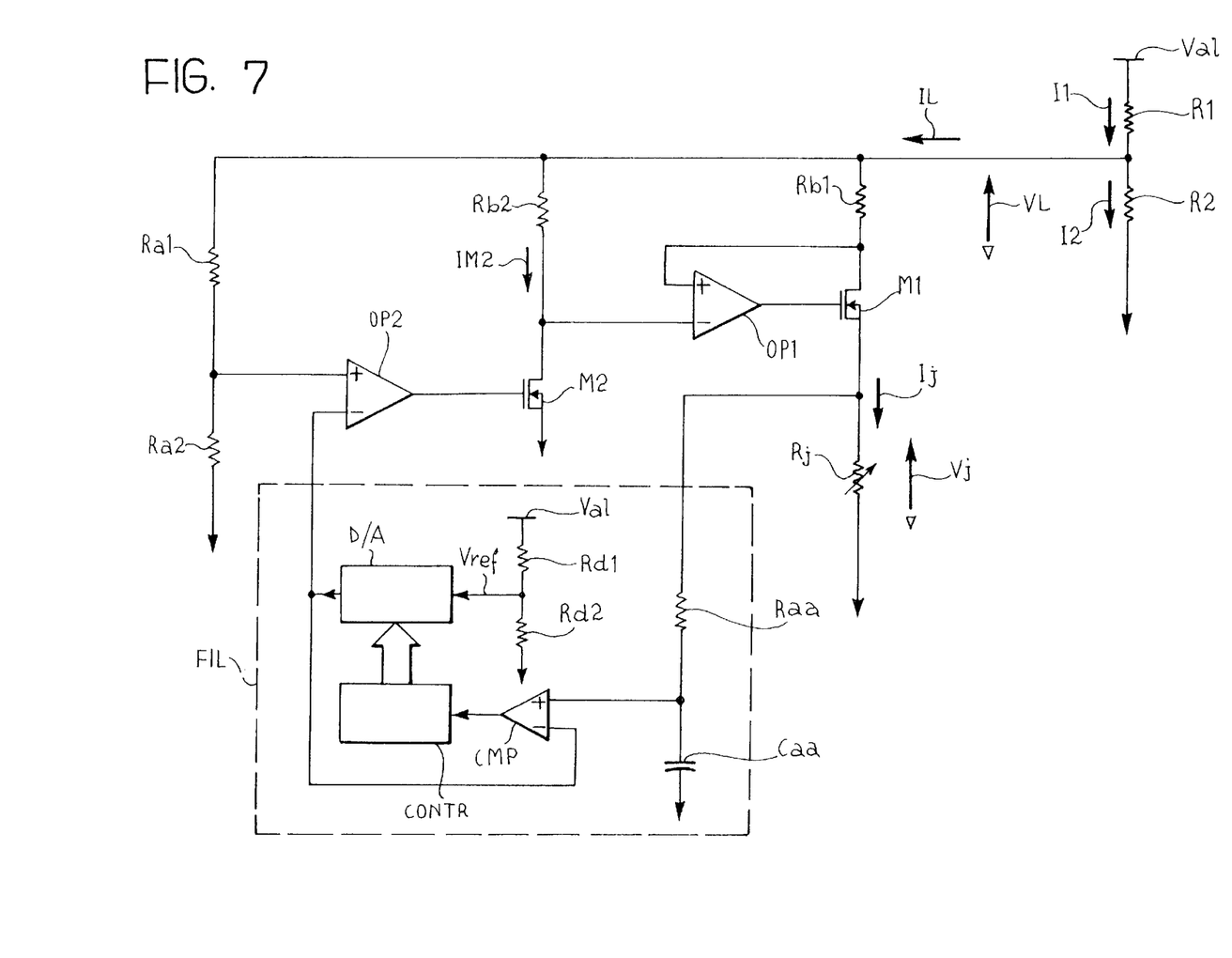

FIG. 7 shows the invention using the filter FIL shown in FIG. 6 in greater detail. The current mirror S can be formed by two resistances Rb2 and Rb1, an operational amplifier OP1 and an NMOS transistor M1. The low-pass filter FIL can be formed by known techniques, by virtue of the fact that, at its input and at its output, there are two voltage signals which tend to become identical in the steady state. This enables the filter FIL to be very precise in terms of errors between input and output in the steady state. In fact, this error depends solely upon the input offset of the comparator CMP and the resolution of the digital/analog converter D/A. The reference voltage Vref of the D/A converter may be provided by a fraction of the supply voltage Vat of the indicator instrument, that is:

$$Vfil=N/(2^{N-1})\ Vref=N/(2^{n-1})\ Val/(1+Rd1/Rd2)$$

where: N=digital output signal of the converter D/A n=number of bits of the converter D/A.

The output voltage VL is therefore instantaneously ratiometric with the supply voltage Vat, irrespective of the response speed of the filter FIL, thus conforming to the requirement for insensitivity to variations of the supply voltage Val. In fact:

$$VL=Vfil\ (1+Ra1/Ra2)$$

$$VL=Val\ N/(2^{n-1})\ (1+Ra1/Ra2)/(1+Rd1/Rd2)$$

from which it can be seen that-the voltage VL is proportional both to the supply voltage Val and to the number N.

Naturally, in the specific embodiment, the resistance ratios Rb1/Rb2 and Ra1/Ra2 are indicated as unitary by way of example, but there is nothing to prevent other selections which lead to an output resistance Rout which is also equal to the input resistance Rj or is multiplied by a scaling factor.

It is, however, very important that these ratios can be unitary, unlike those used in the prior art. In fact resistances having identical values can most easily be combined to achieve the maximum possible precision, this being particularly true when monolithic integration production techniques are used. A further advantage of the invention includes the capability to switch pairs of resistances Rb1 and Rb2 in dependence on the level of current flowing in them so as to maintain therein a voltage drop which is neither too low so that it causes significant errors due to the input offset of the operational amplifier OP1, nor too high so that it prevents the transistor MI from having an adequate voltage Vds to operate correctly.

Figure 8:
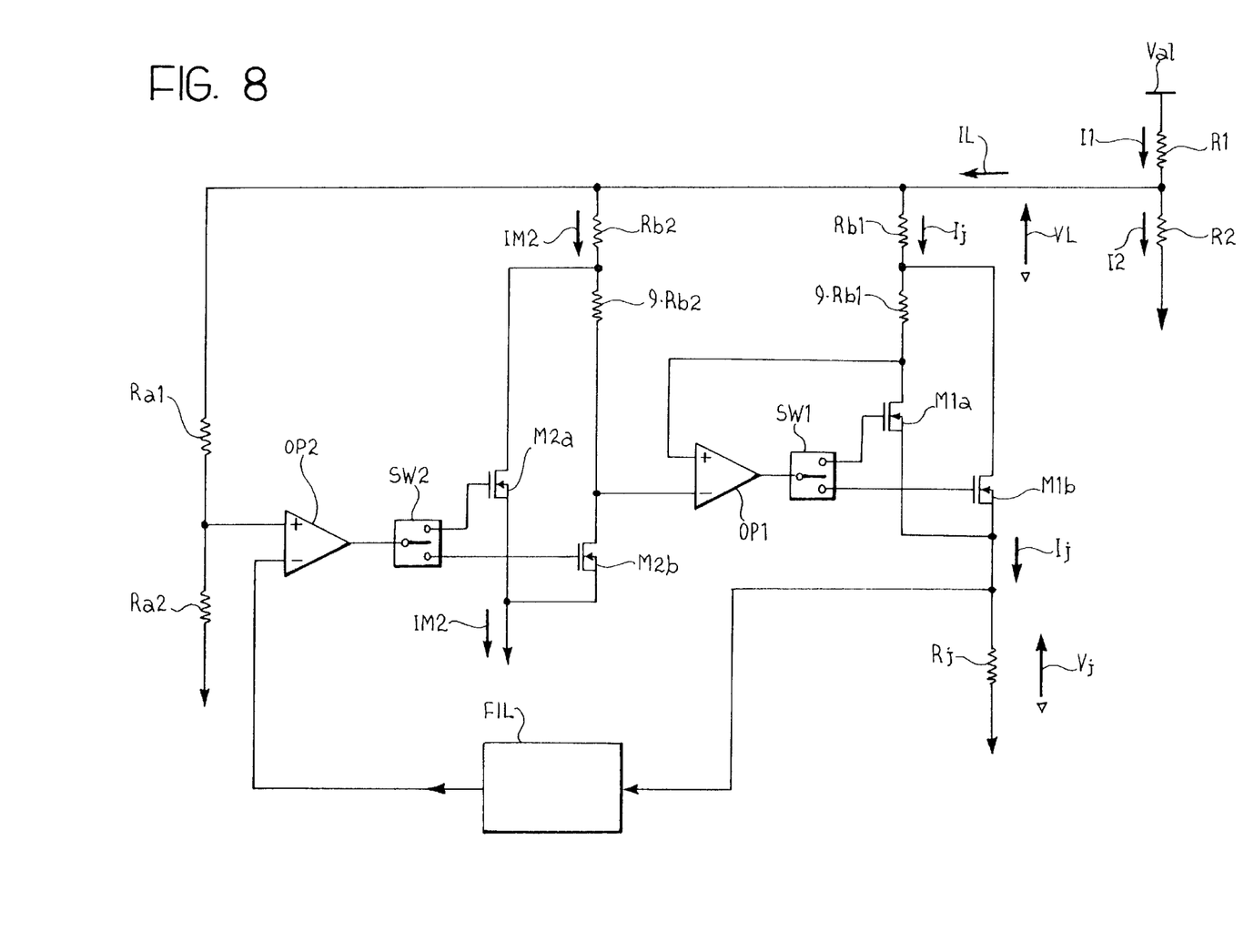

FIG. 8 shows an alternative embodiment in which it is possible to switch several pairs of resistances by means of two solid-state switches SW1 and SW2, in which the limitation to a number of two is made solely by way of example. The same principle applied to the circuits of the prior art would be very difficult to implement and would not achieve the same results in terms of accuracy. It will thus be noted that the circuit according to the invention described above is very simple and inexpensive whilst performing the desired function reliably and accurately. Naturally, the principle of the invention remaining the same, the details of construction and forms of embodiment may be varied widely with respect to those described and illustrated, without thereby departing from the scope of the present invention.

What is claimed is:

1. A processing circuit which is associated with a sensor having a variable first electrical resistance, and for supplying at its output a second electrical resistance proportional to the first electrical resistance, the processing circuit comprising:

a current mirror for sending substantially one half of an output current to the first electrical resistance and substantially one half of the output current to ground; and control means for controlling the current passing through the current mirror based upon a first voltage related to the first electrical resistance, said control means comprising a filter for filtering the first voltage.

2. A processing circuit according to claim 1, wherein a ratio of proportionality between the first electrical resistance and the second electrical resistance is substantially unitary.

3. A processing circuit according to claim 1, wherein a ratio of proportionality between the first electrical resistance and the second electrical resistance is other than about one.

4. A processing circuit according to claim 1, further comprising means for supplying the output current and an output voltage substantially equal, respectively, to twice an input current and twice an input voltage present in the first electrical resistance.

5. A processing circuit according to claim 1, wherein said control means comprises an operational amplifier which receives as inputs a first filtered voltage from said filter and a reference voltage.

6. A processing circuit according to claim 5, further comprising means for supplying a reference voltage to an input of said operational amplifier derived from a supply voltage to ensure the ratiometricity of the circuit.

7. A processing circuit according to claim 1, wherein said filter comprises an analog filter.

8. A processing circuit according to claim 1, wherein said filter comprises a digital filter.

9. A processing circuit according to claim 8, further comprising an analog/digital converter and a digital/analog converter connected to an input and to an output of said digital filter, respectively.

10. A processing circuit according to claim 9, further comprising means for generating a reference voltage used by the analog/digital and digital/analog converters and which is derived from a supply voltage to ensure the ratiometricity of the circuit.

11. A processing circuit according to claim 1, wherein said filter comprises a low-pass filter.

12. A processing circuit according to claim 1, wherein said processing circuit is for interfacing between a level sensor and a display instrument, wherein the level sensor comprises a float connected to the variable first electrical resistance for measuring a fuel level in a vehicle, and wherein said filter comprises a low-pass filter with a relatively long time constant to cancel out fluctuations in the first electrical resistance due to movements of fuel when the vehicle is in motion.

13. A processing circuit which is associated with a sensor having a variable first electrical resistance, and for supplying at its output a second electrical resistance proportional to the first electrical resistance, the processing circuit comprising:

a current mirror for sending substantially one half of an output current to the first electrical resistance and substantially one half of the output current to ground; and control means for controlling the current passing through the current mirror based upon a first voltage related to the first electrical resistance, said control means comprising
a filter for filtering the first voltage, and
an operational amplifier having an output coupled to said current mirror and having inputs for receiving a first filtered voltage from said filter and a reference voltage.

14. A processing circuit according to claim 13, wherein a ratio of proportionality between the first electrical resistance and the second electrical resistance is substantially unitary.

15. A processing circuit according to claim 13, wherein a ratio of proportionality between the first electrical resistance and the second electrical resistance is other than about one.

16. A processing circuit according to claim 13, further comprising means for supplying the output current and an output voltage substantially equal, respectively, to twice an input current and twice an input voltage present in the first electrical resistance.

17. A processing circuit according to claim 13, wherein said filter comprises an analog filter.

18. A processing circuit according to claim 13, wherein said filter comprises a digital filter.

19. A processing circuit according to claim 18, further comprising an analog/digital converter and a digital/analog converter connected to an input and to an output of said digital filter, respectively.

20. A processing circuit according to claim 19, further comprising means for generating the reference voltage used by the analog/digital and digital/analog converters and which is derived from a supply voltage to ensure the ratiometricity of the circuit.

21. A processing circuit according to claim 13, wherein said filter comprises a low-pass filter.

22. A processing circuit according to claim 13, further comprising means for supplying the reference voltage to an input of said operational amplifier derived from a supply voltage to ensure the ratiometricity of the circuit.

23. A processing circuit according to claim 13, wherein said processing circuit is for interfacing between a level sensor and a display instrument, the level sensor comprising a float connected to the variable first electrical resistance for measuring a fuel level in a vehicle, and wherein said filter comprises a low-pass filter with a relatively long time constant to cancel out fluctuations in the first electrical resistance due to movements of fuel when the vehicle is in motion.

24. A liquid level sensing device comprising:
a float and a variable first electrical resistance coupled thereto;
a display instrument;
a processing circuit connected to said first electrical resistance for supplying a second electrical resistance proportional to the first electrical resistance to said display instrument, said processing circuit comprising
a current mirror for sending substantially one half of an output current to the first electrical resistance and substantially one half of the output current to ground, and
control means for controlling the current passing through the current mirror based upon a first voltage related to the first electrical resistance, said control means comprising a filter for filtering the first voltage.

25. A liquid level sensing device according to claim 24, wherein the liquid level of the liquid level sensing device is a fuel level within a vehicle; and wherein said filter comprises a low-pass filter with a relatively long time constant to cancel out fluctuations in the first electrical resistance due to movements of fuel when the vehicle is in motion.

26. A liquid level sensing device according to claim 24, wherein a ratio of proportionality between the first electrical resistance and the second electrical resistance is substantially unitary.

27. A liquid level sensing device according to claim 24, wherein a ratio of proportionality between the first electrical resistance and the second electrical resistance is other than about one.

28. A liquid level sensing device according to claim 24, further comprising means for supplying the output current and an output voltage substantially equal, respectively, to twice an input current and twice an input voltage present in the first electrical resistance.

29. A liquid level sensing device according to claim 24, wherein said control means comprises an operational amplifier which receives as inputs a first filtered voltage from said filter and a reference voltage.

30. A liquid level sensing device according to claim 29, further comprising means for supplying a reference voltage to an input of said operational amplifier derived from a supply voltage to ensure the ratiometricity of the circuit.

31. A liquid level sensing device according to claim 24, wherein said filter comprises an analog filter.

32. A liquid level sensing device according to claim 24, wherein said filter comprises a digital filter.

33. A liquid level sensing device according to claim 32, further comprising an analog/digital converter and a digital/analog converter connected to an input and to an output of said digital filter, respectively.

34. A liquid level sensing device according to claim 33, further comprising means for generating a reference voltage used by the analog/digital and digital/analog converters and which is derived from a supply voltage to ensure the ratiometricity of the circuit.

35. A liquid level sensing device according to claim 24, wherein said filter comprises a low-pass filter.

36. A method for sensing a liquid level using a sensor having a variable first electrical resistance and by supplying as an output a second electrical resistance proportional to the first electrical resistance, the method comprising the steps of:
operating a current mirror for sending substantially one half of an output current to the first electrical resistance and substantially one half of the output current to ground; and
controlling the current passing through the current mirror based upon a first voltage related to the first electrical resistance, the controlling including filtering the first voltage.

37. A method according to claim 36, wherein a ratio of proportionality between the first electrical resistance and the second electrical resistance is substantially unitary.

38. A method according to claim 36, wherein a ratio of proportionality between the first electrical resistance and the second electrical resistance is other than about one.

39. A method according to claim 36, further comprising the step of supplying the output current and an output voltage substantially equal, respectively, to twice an input current and twice an input voltage present in the first electrical resistance.

40. A method according to claim 36, wherein the step of filtering comprises filtering using an analog filter.

41. A method according to claim 36, wherein the step of filtering comprises filtering using a digital filter.

42. A method according to claim 36, wherein the liquid level is a fuel level in a vehicle, and wherein the filtering step comprises filtering using a low-pass filter with a relatively long time constant to cancel out fluctuations in the first electrical resistance due to movements of fuel when the vehicle is in motion.

* * * * *

UNITED STATES PATENT AND TRADEMARK OFFICE
CERTIFICATE OF CORRECTION

PATENT NO. : 5,920,255
DATED : July 6, 1999
INVENTOR(S) : Poletto, et al.

It is certified that error appears in the above-identified patent and that said Letters Patent is hereby corrected as shown below:

On the title page:

Item [75] Inventors    Delete:
                                 "Leghorn"

Substitute:
                                 -- Livorno --

Column 4, line 57:    Delete:
                                 "sing"

Substitute:
                                 -- using --

Column 8 line 53    After "controlling" insert -- step --

Signed and Sealed this

Twenty-first Day of March, 2000

Attest:

Q. TODD DICKINSON

Attesting Officer        Commissioner of Patents and Trademarks